(12) United States Patent
Jiang et al.

(10) Patent No.: US 9,996,147 B2
(45) Date of Patent: Jun. 12, 2018

(54) HIGH TEMPERATURE AND HIGH HUMIDITY TESTING DEVICE AND HIGH TEMPERATURE AND HIGH HUMIDITY TESTING SYSTEM

(71) Applicants: BOE TECHNOLOGY GROUP CO., LTD., Beijing (CN); HEFEI BOE OPTOELECTRONICS TECHNOLOGY CO., LTD., Heifei, Anhui (CN)

(72) Inventors: Yan Jiang, Beijing (CN); Xianzhen Tang, Beijing (CN); Xiaoming Lu, Beijing (CN); Dan Li, Beijing (CN); Xiaowei Gong, Beijing (CN); Chiyoung Kim, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 163 days.

(21) Appl. No.: 15/079,075

(22) Filed: Mar. 24, 2016

(65) Prior Publication Data

US 2016/0299055 A1 Oct. 13, 2016

(30) Foreign Application Priority Data

Apr. 10, 2015 (CN) .......................... 2015 1 0169531

(51) Int. Cl.
*G06F 3/00* (2006.01)
*G02F 1/13* (2006.01)
*G09G 3/00* (2006.01)

(52) U.S. Cl.
CPC .............. *G06F 3/00* (2013.01); *G02F 1/1309* (2013.01); *G02F 2202/99* (2013.01); *G09G 3/006* (2013.01)

(58) Field of Classification Search
CPC ......... G06F 3/00; G09G 3/006; G02F 1/1309; G02F 2202/99
(Continued)

(56) References Cited

U.S. PATENT DOCUMENTS 4,852,389 A * 8/1989 Mayer .................... G01N 15/08
73/38
6,229,325 B1 5/2001 Browning et al.
(Continued)

FOREIGN PATENT DOCUMENTS

CN 1567216 A 1/2005
CN 102109559 A 6/2011
(Continued)

OTHER PUBLICATIONS

Office Action dated Apr. 5, 2017 issued in corresponding Chinese Application No. 201510169531.8.

*Primary Examiner* — Manish S Shah
*Assistant Examiner* — Suman K Nath
(74) *Attorney, Agent, or Firm* — Nath, Goldberg & Meyer; Joshua B. Goldberg (57) ABSTRACT

The invention discloses a high temperature and high humidity testing device and a high temperature and high humidity testing system. The high temperature and high humidity testing device comprises: a test platform composed of a work area and a non-work area, the work area is used for carrying a under-test portion of a display panel, and the non-work area is used for carrying a non-test portion of the display panel; and a sealing cover arranged above the work area, wherein the sealing cover and the test platform jointly
(Continued)

form a sealed chamber in the work area, the test platform is provided with a gas guide through groove in the work area, and the gas guide through groove is used for delivering high temperature and high humidity gas to the sealed chamber.

12 Claims, 5 Drawing Sheets

(58) Field of Classification Search
USPC ....... 73/866, 865.9, 431, 432, 865.6, 118.01, 73/49.3
See application file for complete search history.

(56) References Cited

U.S. PATENT DOCUMENTS

| | | | | |
|---|---|---|---|---|
| 6,583,643 B2* | 6/2003 | Lin | ........................ | G09G 3/006 324/760.01 |
| 7,614,282 B2* | 11/2009 | Eliasson | ................ | G01M 3/363 73/49.3 |
| 2003/0113942 A1* | 6/2003 | Lin | ........................ | G09G 3/006 438/14 |
| 2011/0068816 A1* | 3/2011 | Kwon | .................... | G02F 1/1309 324/756.01 |

FOREIGN PATENT DOCUMENTS

| | | |
|---|---|---|
| CN | 201893104 U | 7/2011 |
| CN | 104111439 A | 10/2014 |
| CN | 104215891 A | 12/2014 |

\* cited by examiner

Fig. 10

HIGH TEMPERATURE AND HIGH HUMIDITY TESTING DEVICE AND HIGH TEMPERATURE AND HIGH HUMIDITY TESTING SYSTEM

FIELD OF THE INVENTION

The present invention relates to the field of display technology, and particularly relates to a high temperature and high humidity testing device and a high temperature and high humidity testing system.

BACKGROUND OF THE INVENTION

In order to ensure that display panels can stand the influences of different environments at different latitudes, different regions, different altitudes and the like so that products can still be normally used in different use environments (severe cold regions, low-latitude extremely hot regions, high-humidity regions of coastal cities, high-temperature environments in automobiles and the like), a certain quantity of display panels are extracted in the production process, high temperature and high humidity (a temperature of 100° C. and a humidity of 100%) test is performed on bounding areas of these display panels, and then the tolerance of the products under severe conditions is assessed.

Figure 1:
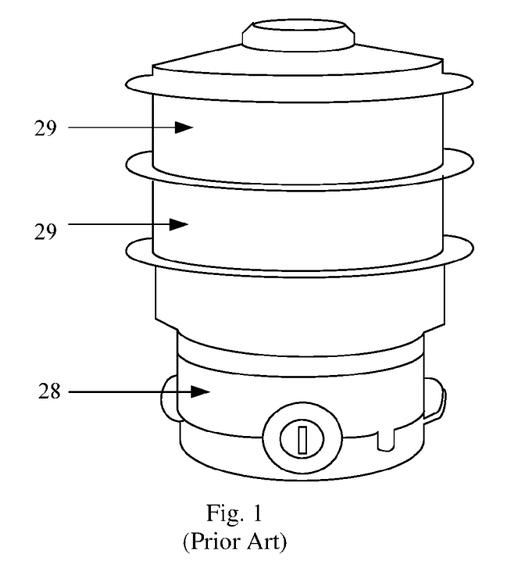
FIG. 1 is a structural schematic diagram of a high temperature and high humidity testing device in the prior art.

FIG. 1 is a structural schematic diagram of a high temperature and high humidity testing device in the prior art. As shown in FIG. 1, the high temperature and high humidity testing device includes a steam generating portion 28 and a plurality of test layers 29 which are superposed above the steam generating portion 28, a sealing cover is disposed at the top of the uppermost test layer 29, wherein vents are formed at the bottom of each test layer 29, and high temperature and high humidity gas generated by the steam generating portion 28 enters each test layer 29 through the vents.

When a display panel is tested using the existing high temperature and high humidity testing device, firstly the whole display panel is put into the test layer and then taken out after a period of time, and the tolerance of the display panel under the severe condition is assessed based on the display effect of the display panel.

However, the existing testing method has the following problems; since the whole display panel needs to be put into the test layer, a under-test portion (e.g. a hounding area) and a non-test portion (e.g. a POLL, attachment portion, an IC attachment portion, a display area, etc.) of the display panel are both positioned in the test environment, that is, the test environment may simultaneously influence the under-test portion and the non-test portion. In the process of verifying the display effect of the display panel, when displaying of the display panel is abnormal, it cannot be determined whether the abnormity is caused by poor tolerance of the under-test portion or caused by damage to the non-test portion in the test process, so that the assessment is influenced. Moreover, when the non-test portion is damaged in the test process, since the damage is irreparable, the display panel is directly scrapped.

SUMMARY OF THE INVENTION

The present invention has been accomplished in order to solve the above problems and it is an object thereof to provide a high temperature and high humidity testing device and a high temperature and high humidity testing system capable of separately performing high temperature and high humidity test on a under-test portion of a display panel without damaging a non-test portion of the display panel.

According to a first aspect of the present invention, there is provided a high temperature and high humidity testing device comprising:

a test platform composed of a work area and a non-work area, the work area is used for carrying a under-test portion of a display panel, and the non-work area is used for carrying a non-test portion of the display panel; and a sealing cover arranged above the work area, wherein the sealing cover and the test platform jointly form a sealed chamber in the work area, the test platform is provided with a gas guide through groove in the work area, and the gas guide through groove is used for delivering high temperature and high humidity gas into the sealed chamber.

According to a second aspect of the present invention, there is provided a high temperature and high humidity testing device according to the first aspect, wherein the sealing cover comprises a cover top provided with a gas outlet through groove for exhausting high temperature and high humidity gas in the sealed chamber, and surrounding walls formed by bending the edges of four sides of the cover top downwards.

According to a third aspect of the present invention, there is provided a high temperature and high humidity testing device according to the second aspect, wherein the cover top is provided with a telescopic baffle capable of opening and closing the gas outlet through groove.

According to a fourth aspect of the present invention, there is provided a high temperature and high humidity testing device according to the second aspect, wherein the surrounding walls comprise a first surrounding wall, a second surrounding wall, a third surrounding wall and a fourth surrounding wall, the first surrounding wall is opposite to the third surrounding wall, the second surrounding wall is opposite to the fourth surrounding wall, and the first surrounding wall is positioned at the junction of the work area and the non-work area;

a magnetic flexible seal is arranged below the first surrounding wall; and the third surrounding wall is rotatably connected with the test platform.

According to a fifth aspect of the present invention, there is provided a high temperature and high humidity testing device according to the fourth aspect, wherein a fixed block is arranged on the outer side of each of the second surrounding wall and the fourth surrounding wall, and the bottom surfaces of the fixed blocks are fixedly connected with the test platform; and the first surrounding wall is detachably connected with the fixed blocks by hasps.

According to a sixth aspect of the present invention, there is provided a high temperature and high humidity testing device according to the second aspect, wherein a first flange surrounding the gas guide through groove is formed on the bottom surface of the test platform;

a second flange surrounding the gas outlet through groove is formed on the upper surface of the cover top;

the inner wall contour of the second flange is the same as the outer wall contour of the first flange; and when a plurality of high temperature and high humidity testing devices are superposed, the first flanges are hermetically clamped into the second flanges.

According to a seventh aspect of the present invention, there is provided a high temperature and high humidity testing device according to the sixth aspect, wherein a first gap is formed in the peripheral area of the non-work area, and a first assembly structure is positioned at the first gap;

the first assembly structure includes a connecting block, a first footing and a first supporting block, the connecting block and the inner wall of the first gap are fixed together, a second gap is formed in the bottom of the connecting block, the first footing is positioned in the second gap and rotatably connected with the inner wall of the first gap, a first clamping post is arranged on the first footing, and the first footing drives the first clamping post to rotate within a vertical plane; and a first clamping groove matched with the first clamping post is formed on the bottom surface of the first supporting block, the first supporting block is connected with the side wall of the connecting block through a hinge, and when the first supporting block rotates to a position above the connecting block through the hinge, the projection of the first clamping groove in the vertical direction overlaps that of the first clamping post which is in a downward state in the vertical direction.

According to an eighth aspect of the present invention, there is provided a high temperature and high humidity testing device according to the seventh aspect, wherein the upper surfaces of the connecting block and the first supporting block are each at a level lower than the upper surface of the non-work area; and the hinge is positioned below a plane where the upper surface of the non-work area is located.

According to a ninth aspect of the present invention, there is provided a high temperature and high humidity testing device according to the seventh aspect, wherein the first supporting block is provided with a first convex portion facing at least one side wall of the inner wall of the first gap, a second convex portion corresponding to the first convex portion is formed on the inner wall of the first gap, and the second convex portion is positioned below the first convex portion.

According to a tenth aspect of the present invention, there is provided a high temperature and high humidity testing device according to the seventh aspect, wherein the connecting block and the test platform are formed integrally.

According to an eleventh aspect of the present invention, there is provided a high temperature and high humidity testing device according to the sixth aspect, wherein a third gap is formed at the bottom of the peripheral area of the work area, and a second footing is provided in the third gap;

the second footing is rotatably connected with the inner wall of the third gap, a second clamping post is arranged on the second footing, and the second footing drives the second clamping post to rotate within a vertical plane; and the test platform is provided with a second supporting block at a position corresponding to the second footing, the bottom surface of the second supporting block is fixedly connected with the test platform, a second clamping groove matched with the second clamping post is formed on the upper surface of the second supporting block, and the projection of the second clamping groove in the vertical direction overlaps that of the second clamping post which is in a downward state in the vertical direction.

According to a twelfth aspect of the present invention, there is provided a high temperature and high humidity testing device according to the seventh aspect, wherein a third gap is formed at the bottom of the peripheral area of the work area, and a second footing is provided in the third gap;

the second footing is rotatably connected with the inner wall of the third gap, a second clamping post is arranged on the second footing, and the second footing drives the second clamping post to rotate within a vertical plane; and the test platform is provided with a second supporting block at a position corresponding to the second footing, the bottom surface of the second supporting block is fixedly connected with the test platform, a second clamping groove matched with the second clamping post is formed on the upper surface of the second supporting block, and the projection of the second clamping groove in the vertical direction overlaps that of the second clamping post which is in a downward state in the vertical direction.

According to a thirteenth aspect of the present invention, there is provided a high temperature and high humidity testing system comprising:

a gas generating device; and at least one high temperature and high humidity testing device, which is the one according to the above aspects;

wherein the gas generating device generates high temperature and high humidity gas.

In the high temperature and high humidity testing device according to the first aspect and the high temperature and high humidity testing system according to the thirteenth aspect, the test platform is divided into a work area and a non-work area in the present invention, the under-test portion of the display panel is positioned at the work area, the non-test portion of the display panel is positioned at the non-work area, and high temperature and high humidity test is only performed on the under-test portion in the work area during testing, so that the non-test portion of the display panel is prevented from being damaged in the test process.

In the high temperature and high humidity testing devices according to the second aspect and the sixth aspect, good sealing property can be provided, and a plurality of high temperature and high humidity testing devices can simultaneously perform high temperature and high humidity test, so that the test efficiency is effectively improved.

In the high temperature and high humidity testing devices according to the third aspect to the fifth aspect, good sealing property can be provided.

In the high temperature and high humidity testing devices according to the seventh aspect and the tenth aspect to the twelfth aspect, the stability when a plurality of high temperature and high humidity testing devices are superposed can be effectively improved.

In the high temperature and high humidity testing device according to the eighth aspect, the display panel can be prevented from colliding with the hinge during placing, so that the display panel can be prevented from being damaged.

In the high temperature and high humidity testing device according to the ninth aspect, the first supporting block can be well supported in an initial state.

DETAILED DESCRIPTION OF THE EMBODIMENTS

In order that those skilled in the art can better understand the present invention, the exemplary embodiments of a high temperature and high humidity testing device according to the present invention will be described in detail below in combination with the accompanying drawings.

First Embodiment

Figure 2:
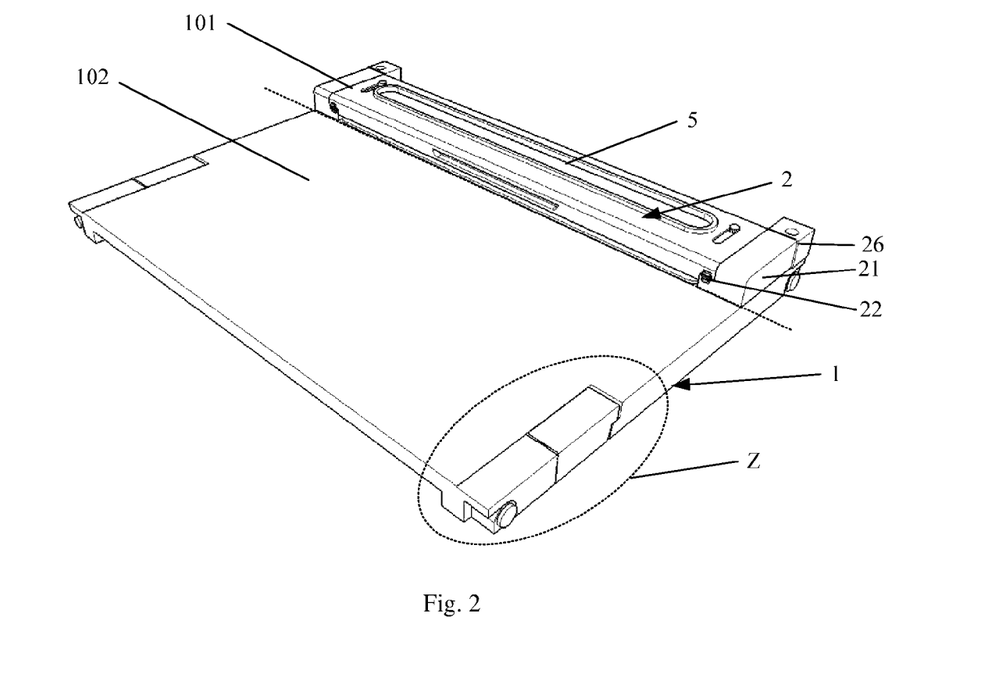
FIG. 2 is a structural schematic diagram of a high temperature and high humidity testing device according to the first embodiment of the present invention.
Figure 3:
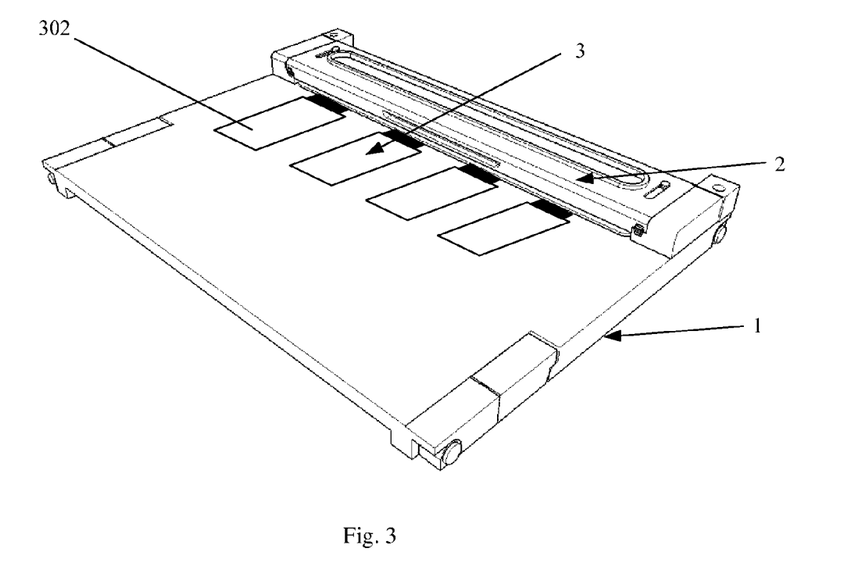
FIG. 3 is a schematic diagram when the high temperature and high humidity testing device shown in FIG. 2 performs high temperature and high humidity test on small-sized display panels.
Figure 4:
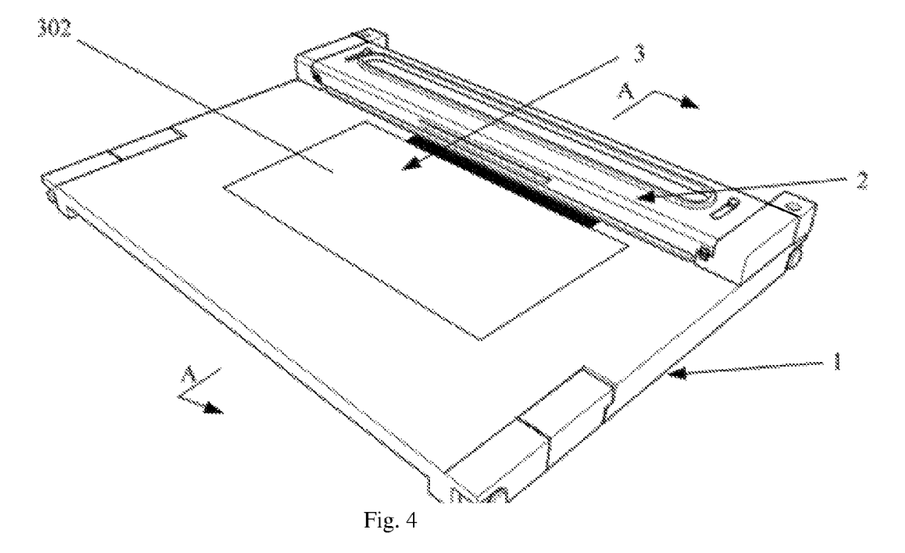
FIG. 4 is a schematic diagram when the high temperature and high humidity testing device shown in FIG. 2 performs high temperature and high humidity test on large-sized display panels.
Figure 5:
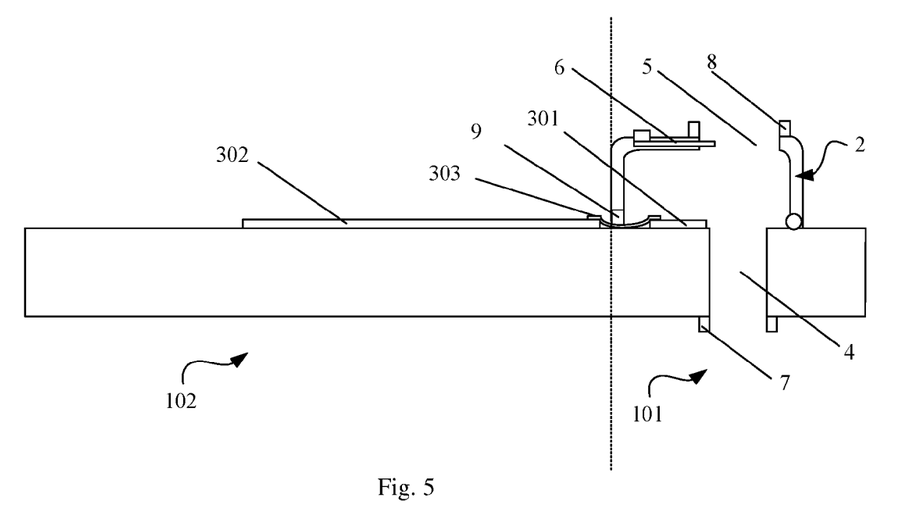
FIG. 5 is a schematic diagram of a cross section taken along line A-A of FIG. 4.

FIG. 2 is a structural schematic diagram of a high temperature and high humidity testing device according to the first embodiment of the present invention, FIG. 3 is a schematic diagram when the high temperature and high humidity testing device shown in FIG. 2 performs high temperature and high humidity test on small-sized display panels, FIG. 4 is a schematic diagram when the high temperature and high humidity testing device shown in FIG. 2 performs high temperature and high humidity test on large-sized display panels 3, and FIG. 5 is a schematic diagram of a cross section taken along line A-A of FIG. 4. As shown in FIG. 2 to FIG. 5, the high temperature and high humidity testing device includes: a test platform 1 composed of a work area 101 and a non-work area 102, the work area 101 is used for carrying a under-test portion 301 of a display panel 3, and the non-work area 102 is used for carrying a non-test portion 302 of the display panel 3; and a sealing cover 2 arranged above the work area 101, wherein the sealing cover 2 and the test platform 1 jointly form a sealed chamber in the work area 101, the test platform 1 is provided with a gas guide through groove 4 in the work area 101, and the gas guide through groove 4 is used for delivering high temperature and high humidity gas into the sealed chamber. The high temperature and high humidity gas specifically may be high-temperature water vapor.

With reference to FIG. 3, when the under-test display panels 3 are small in size, the high temperature and high humidity testing device can simultaneously test a plurality of small-sized display panels 3; and with reference to FIG. 4, when the under-test display panels 3 are large in size, the high temperature and high humidity testing device can test the large-sized display panels 3 one by one.

In the high temperature and high humidity testing device according to of the first embodiment, the test platform 1 is divided into a work area 101 and a non-work area 102, the under-test portion 301 of the display panel 3 is positioned at the work area 101, the non-test portion 302 of the display panel 3 is positioned at the non-work area 102, and high temperature and high humidity test is only performed on the under-test portion 301 in the work area 101 during testing, so that the non-test portion 302 of the display panel 3 is prevented from being damaged in the test process.

The specific structure of the sealing cover 2 of the high temperature and high humidity testing device will be described in detail below in combination with an accompanying drawing.

Figure 6:
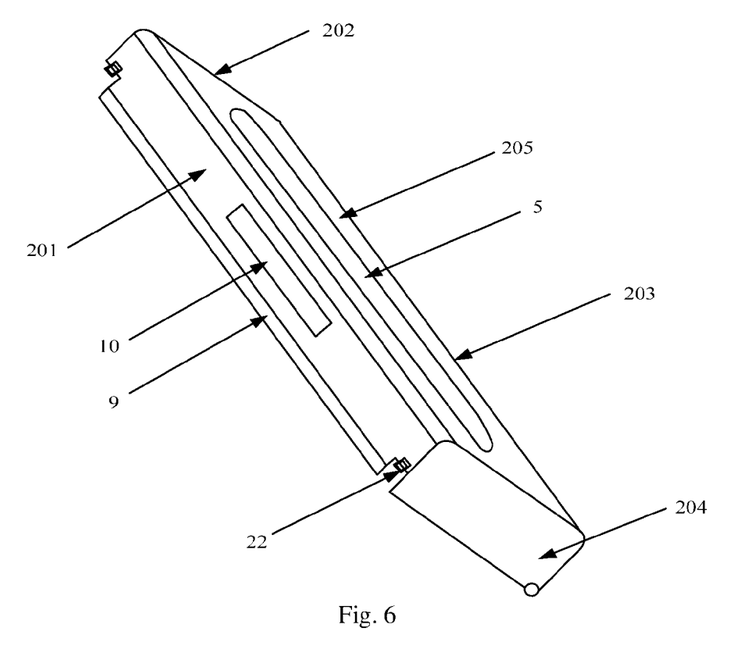
FIG. 6 is a structural schematic diagram of a sealing cover in FIG. 2.

FIG. 6 is a structural schematic diagram of the sealing cover 2 in FIG. 2. As shown in FIG. 6, the sealing cover 2 includes a cover top 205 provided with a gas outlet through groove 5 for exhausting high temperature and high humidity gas in the sealed chamber, and surrounding walls formed by bending the edges of four sides of the cover top 205 downwards. Further, the cover top 205 is provided with a telescopic baffle 6 capable of opening and closing the gas outlet through groove 5.

In this embodiment, closing or opening of the gas outlet through groove 5 can be correspondingly controlled by controlling the baffle 6 to extend or retract. Moreover, superposition of a plurality of high temperature and high humidity testing devices becomes possible through the gas outlet through groove 5, and the specific solution will be described below.

Further, the surrounding walls include a first surrounding wall 201, a second surrounding wall 202, a third surrounding wall 203 and a fourth surrounding wall 204, the first surrounding wall 201 is opposite to the third surrounding wall 203, the second surrounding wall 202 is opposite to the fourth surrounding wall 204, and the first surrounding wall 201 is positioned at the junction of the work area 101 and the non-work area 102, A magnetic flexible seal 9 is arranged below the first surrounding wall 201, and the third surrounding wall 203 is rotatably connected with the test platform 1.

It should be noted that in the practical design process, the test platform 1 can be made of a metal material that can be attracted by a magnetic matter, and when the third surrounding wall 203 rotates to drive the first surrounding wall 201 to move to a position in contact with the test platform 1, the magnetic flexible seal 9 below the first surrounding wall 201 attracts the test platform 1, so that the sealing cover 2 seals the test platform 1. When the test platform 1 itself cannot be attracted by the magnetic flexible seal 9, some metal material attracted by the magnetic matter can be arranged at the junction of the work area 101 and the non-work area 102. Moreover, when the magnetic flexible seal 9 is in contact with the test platform 1, since the magnetic flexible seal 9 has good flexibility, the magnetic flexible seal 9 does not destroy a flexible circuit board 303, used for connecting the under-test portion 301 with the non-test portion 302, of the display panel 3.

Optionally, the first surrounding wall 201 is provided with a concave portion 10, and the first surrounding wall 201 can be lifted through the concave portion 10 after the high temperature and high humidity test so that the tested display panel 3 can be taken out.

However, in the practical high temperature and high humidity test process, the sealing cover 2 is easily jacked (the first surrounding wall 201 is separated from the upper surface of the test platform 1) due to high air pressure in the sealed chamber, so that the sealing environment of the sealed chamber is broken. In order to solve the technical problem, in this embodiment, optionally, a fixed block 21 is arranged on the outer side of each of the second surrounding wall 202 and the fourth surrounding wall 204, the bottom surfaces of the fixed blocks 21 are fixedly connected with the test platform 1, and the first surrounding wall 201 is detachably connected with the fixed blocks 21 by hasps 22. The first surrounding wall 201 is fixed to the fixed blocks 21 by the hasps 22 during testing, so that the sealing cover 2 can be prevented from being jacked.

A structure of high temperature and high humidity test when two high temperature and high humidity testing devices are superposed will be described below in combination with the accompanying drawings.

Figure 7:
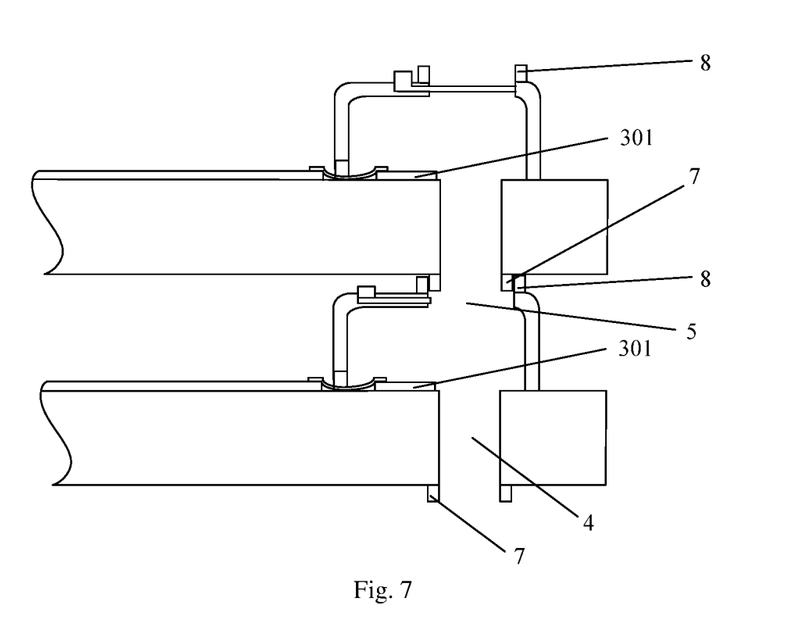
FIG. 7 is a schematic diagram showing the clamping positions of first flanges and second flanges when two high temperature and high humidity testing devices are superposed.

FIG. 7 is a schematic diagram showing the clamping positions of first flanges and second flanges when two high temperature and high humidity testing devices are superposed. As shown in FIG. 7, a first flange 7 surrounding the gas guide through groove 4 is formed on the bottom surface of the test platform 1, a second flange 8 surrounding the gas outlet through groove 5 is formed on the upper surface of the cover top 205, the inner wall contour of the second flange 8 is the same as the outer wall contour of the first flange 7, then when a plurality of high temperature and high humidity testing devices are superposed, the first flanges 7 are hermetically clamped into the second flanges 8, and the gas outlet through groove 5 of the lower high temperature and high humidity testing device is in a break-over state, so that the sealed chambers in the two high temperature and high humidity testing devices are communicated. Thus, the two high temperature and high humidity testing devices can simultaneously perform high temperature and high humidity test by deploying only one gas generating device, so that the test efficiency can be effectively improved.

It could be understood by those skilled in the art that, the above situation that the two high temperature and high humidity testing devices are superposed to simultaneously perform high temperature and high humidity test is merely exemplary, and more high temperature and high humidity testing devices according to the exemplary embodiment of the present invention can also be superposed to simultaneously perform high temperature and high humidity test.

Figure 8:
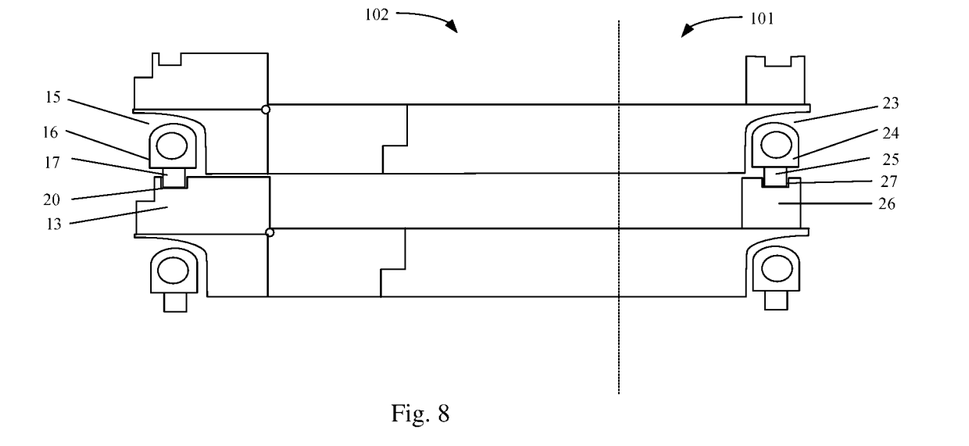
FIG. 8 is a side schematic diagram when two high temperature and high humidity testing devices shown in FIG. 2 are superposed.

FIG. 8 is a schematic diagram of a side when two high temperature and high humidity testing devices shown in FIG. 2 are superposed. As shown in FIG. 8, when two high temperature and high humidity testing devices are superposed, the test platforms 1 are not provided with corresponding supporting structures on the side where the non-work areas 102 are located, so that the test platforms 1 are instable. In order to solve the above technical problem, in this embodiment, a first gap (not shown in FIG. 8) is formed at the peripheral area of the non-work area 102 of the test platform 1, and a first assembly structure is provided in the first gap. It should be noted that the first assembly structure corresponds to the Z structure in FIG. 2, and the first assembly structure will be described in detail below.

Figure 9:
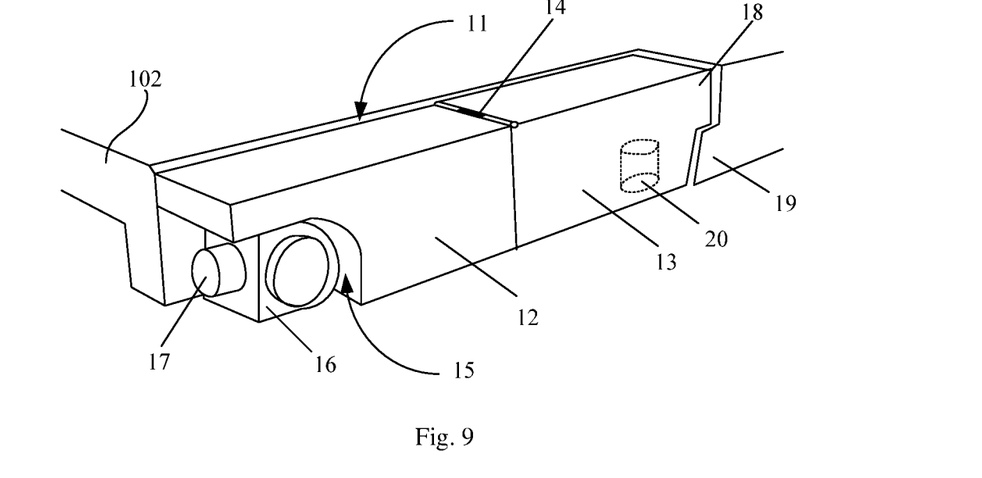
FIG. 9 is a structural schematic diagram of a first assembly structure in an initial state.

FIG. 9 is a structural schematic diagram of the first assembly structure in an initial state. As shown in FIG. 9, the first assembly structure includes a connecting block 12, a first footing 16 and a first supporting block 13, wherein the connecting block 12 and the inner wall of the first gap 11 are fixed together, a second gap 15 is formed in the bottom of the connecting block 12, the first footing 16 is positioned in the second gap 15 and rotatably connected with the inner wall of the first gap 11, a first clamping post 17 is arranged on the first footing 16, the first footing 16 drives the first clamping post 17 to rotate within a vertical plane, a first clamping groove 20 matched with the first clamping post 17 is formed on the bottom surface of the first supporting block 13, and the first supporting block 13 is connected with the side wall of the connecting block 12 through a hinge 14.

Figure 10:
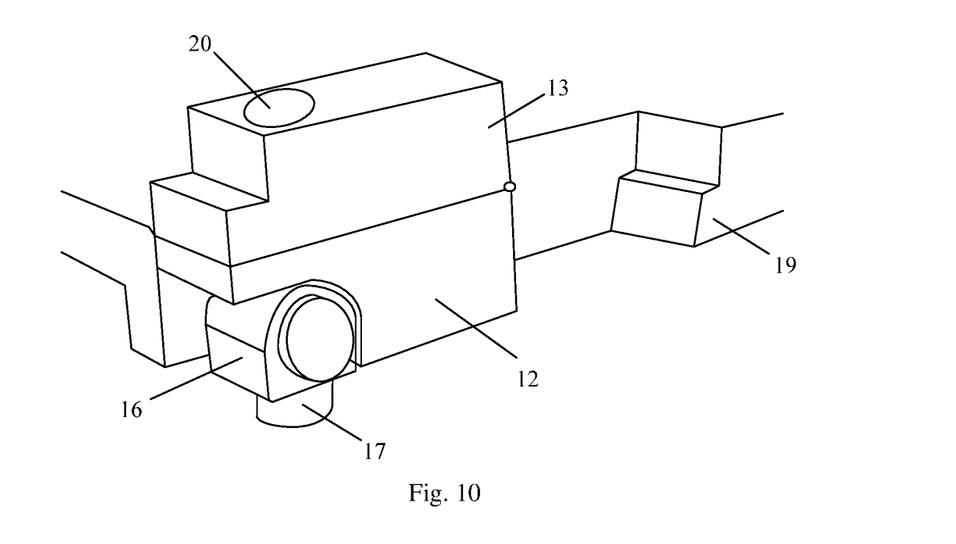
FIG. 10 is a structural schematic diagram of the first assembly structure in a to-be-assembled state.

FIG. 10 is a structural schematic diagram of the first assembly structure in a to-be-assembled state. As shown in FIG. 10, when the first assembly structure is in the to-be-assembled state, the first supporting block 13 rotates to a position above the connecting block 12 through the hinge 14, and the projection of the first clamping groove 20 in the vertical direction overlaps that of the first clamping post 17 which is in a downward state in the vertical direction.

Optionally, the connecting block 12 and the test platform 1 are formed integrally.

It should be noted that the situation that the first gap 11 is positioned at the corner of the non-work area 102 of the test platform 1 in the accompanying drawing is merely exemplary. In this embodiment, the first gap 11 may be positioned at any position at the peripheral area of the non-work area 102 of the test platform 1.

With reference to FIG. 8 and FIG. 10, since the projection of the first clamping groove 20 in the vertical direction overlaps that of the first clamping post 17 which is in a downward state in the vertical direction in the assembly state, the first clamping post 17 in the upper high temperature and high humidity testing device can be clamped into the first clamping groove 20 in the lower high temperature and high humidity testing device, so that the stability when the two high temperature and high humidity testing devices are superposed is effectively ensured.

Continuously see FIG. 9. Optionally, the upper surfaces of the connecting block 12 and the first supporting block 13 are each at a level lower than the upper surface of the non-work area 102, and the hinge 14 is positioned below a plane where the upper surface of the non-work area 102 is located. In this embodiment, the hinge 14 is sunken, so that the display panel 3 can be prevented from colliding with the hinge 14 during placing, and the display panel 3 can be prevented from being damaged.

Optionally, the first supporting block 13 is provided with a first convex portion 18 facing at least one side wall of the inner wall of the first gap 11, a second convex portion 19 corresponding to the first convex portion 18 is formed on the inner wall of the first gap 11, and the second convex portion 19 is positioned below the first convex portion 18. In this embodiment, the first supporting block 13 can be well supported in the initial state under the coordination of the first convex portion 18 and the second convex portion 19.

Moreover, continuously see FIG. 8. In order to further improve the stability when the high temperature and high humidity testing devices are superposed, in this embodiment, optionally, a third gap 23 is formed at the bottom of the peripheral area of the work area. 101 of the test platform 1, and a second footing 24 is provided in the third gap 23; the second footing 24 is rotatably connected with the inner wall of the third gap 23, a second clamping post 25 is arranged on the second footing 24, and the second footing 24 drives the second clamping post 25 to rotate within a vertical plane; and the test platform 1 is provided with a second supporting block 26 at a position corresponding to the second footing 24, the bottom surface of the second supporting block 26 is fixedly connected with the test platform 1, a second clamping groove 27 matched with the second clamping post 25 is formed on the upper surface of the second supporting block 26, and the projection of the second clamping groove 27 in the vertical direction overlaps that of the second clamping post 25 which is in a downward state in the vertical direction. When the high temperature and high humidity testing devices are superposed, the second clamping post 25 in the upper high temperature and high humidity testing device can be clamped into the second clamping groove 27 in the lower high temperature and high humidity testing device.

It should be noted that the situation that the third gap 23 is positioned at the corner of the work area 101 of the test platform 1 in the accompanying drawing is merely exemplary. In this embodiment, the third gap 23 may be positioned at any position in the bottom of the peripheral area of the work area 101 of the test platform 1.

In this embodiment, the stability when the high temperature and high humidity testing devices are superposed can be effectively improved under the coordination of the first clamping post 17 and the first clamping groove 20 in the non-work area 102 and the coordination of the second clamping post 25 and the second clamping groove 27 in the work area 101.

It should be noted that the second supporting block 26 and the fixed blocks 21 may be formed integrally.

The first embodiment of the present invention provides a high temperature and high humidity testing device, which includes: a test platform composed of a work area and a non-work area, the work area is used for carrying a under-test portion of a display panel, and the non-work area is used for carrying a non-test portion of the display panel; and a sealing cover arranged above the work area, wherein the sealing cover and the test platform jointly form a sealed chamber in the work area, the test platform is provided with a gas guide through groove in the work area, and the gas guide through groove is used for delivering high temperature and high humidity gas into the sealed chamber. In the present invention, the test platform is divided into a work area and a non-work area, the under-test portion of the display panel is positioned at the work area, the non-test portion of the display panel is positioned at the non-work area, and high temperature and high humidity test is only performed on the under-test portion in the work area during testing, so that the non-test portion of the display panel is prevented from being damaged in the test process.

Second Embodiment

The second embodiment of the present invention provides a high temperature and high humidity testing system, which includes a gas generating device and at least one high temperature and high humidity testing device, wherein the gas generating device generates high temperature and high humidity gas, the high temperature and high humidity testing device is the one provided in the first embodiment, and for the specific content of the high temperature and high humidity testing device, reference may be made to the description in the first embodiment, which will not be redundantly described herein.

It should be understood that the above embodiments are merely exemplary embodiments for the purpose of illustrating the principle of the disclosure, and the disclosure is not limited thereto. Various modifications and improvements can be made by a person having ordinary skill in the art without departing from the spirit and essence of the disclosure. Accordingly, all of the modifications and improvements also fall into the protection scope of the disclosure.

What is claimed is:

1. A testing device comprising:
    a test platform composed of a work area and a non-work area, the work area is configured to carry a under-test portion of a display panel, and the non-work area is configured to carry a non-test portion of the display panel; and
    a sealing cover arranged above the work area,
    wherein the sealing cover and the test platform jointly form a sealed chamber in the work area, the test platform is provided with a gas guide through groove in the work area, and the gas guide through groove is configured to deliver heated humidified gas into the sealed chamber, and
    wherein the sealing cover comprises a cover top provided with a gas outlet through groove for exhausting gas in the sealed chamber, and surrounding walls formed by bending the edges of four sides of the cover top downwards.

2. The testing device according to claim 1,
    wherein the cover top is provided with a telescopic baffle capable of opening and closing the gas outlet through groove.

3. The testing device according to claim 1,
    wherein the surrounding walls comprise a first surrounding wall, a second surrounding wall, a third surrounding wall and a fourth surrounding wall, the first surrounding wall is opposite to the third surrounding wall, the second surrounding wall is opposite to the fourth surrounding wall, and the first surrounding wall is positioned at the junction of the work area and the non-work area;
    a magnetic flexible seal is arranged below the first surrounding wall; and
    the third surrounding wall is rotatably connected with the test platform.

4. The testing device according to claim 3,
    wherein a fixed block is arranged on the outer side of each of the second surrounding wall and the fourth surrounding wall, and the bottom surfaces of the fixed blocks are fixedly connected with the test platform; and
    the first surrounding wall is detachably connected with the fixed blocks by hasps.

5. The testing device according to claim 1,
    wherein a first flange surrounding the gas guide through groove is formed on the bottom surface of the test platform;
    a second flange surrounding the gas outlet through groove is formed on the upper surface of the cover top;
    the inner wall contour of the second flange is the same as the outer wall contour of the first flange; and
    when a plurality of testing devices are superposed, the first flanges are hermetically clamped into the second flanges.

6. The testing device according to claim 5,
    wherein a first gap is formed in a peripheral area of the non-work area, and a first assembly structure is positioned at the first gap;
    the first assembly structure comprises a connecting block, a first footing and a first supporting block, the connecting block and the inner wall of the first gap are fixed together, a second gap is formed in the bottom of the connecting block, the first footing is positioned in the second gap and rotatably connected with the inner wall of the first gap, a first clamping post is arranged on the first footing, and the first footing drives the first clamping post to rotate within a vertical plane; and
    a first clamping groove matched with the first clamping post is formed on the bottom surface of the first supporting block, the first supporting block is connected with the side wall of the connecting block through a hinge, and when the first supporting block rotates to a position above the connecting block through the hinge, the projection of the first clamping groove in the vertical direction overlaps that of the first clamping post which is in a downward state in the vertical direction.

7. The testing device according to claim 6,
wherein the upper surfaces of the connecting block and the first supporting block are each at a level lower than the upper surface of the non-work area; and
the hinge is positioned below a plane where the upper surface of the non-work area is located.

8. The testing device according to claim 6,
wherein the first supporting block is provided with a first convex portion facing at least one side wall of the inner wall of the first gap, a second convex portion corresponding to the first convex portion is formed on the inner wall of the first gap, and the second convex portion is positioned below the first convex portion.

9. The testing device according to claim 6,
wherein the connecting block and the test platform are formed integrally.

10. The testing device according to claim 5,
wherein a third gap is formed at the bottom of the peripheral area of the work area, and a second footing is provided in the third gap;
the second footing is rotatably connected with the inner wall of the third gap, a second clamping post is arranged on the second footing, and the second footing drives the second clamping post to rotate within a vertical plane; and
the test platform is provided with a second supporting block at a position corresponding to the second footing, the bottom surface of the second supporting block is fixedly connected with the test platform, a second clamping groove matched with the second clamping post is formed on the upper surface of the second supporting block, and the projection of the second clamping groove in the vertical direction overlaps that of the second clamping post which is in a downward state in the vertical direction.

11. The testing device according to claim 6,
wherein a third gap is formed at the bottom of the peripheral area of the work area, and a second footing is provided in the third gap;
the second footing is rotatably connected with the inner wall of the third gap, a second clamping post is arranged on the second footing, and the second footing drives the second clamping post to rotate within a vertical plane; and
the test platform is provided with a second supporting block at a position corresponding to the second footing, the bottom surface of the second supporting block is fixedly connected with the test platform, a second clamping groove matched with the second clamping post is formed on the upper surface of the second supporting block, and the projection of the second clamping groove in the vertical direction overlaps that of the second clamping post which is in a downward state in the vertical direction.

12. A testing system comprising:
a gas generating device; and
at least one testing device, which is the one according to claim 1,
wherein the gas generating device generates heated humidified gas.

* * * * *